United States Patent
Martin et al.

(10) Patent No.: US 10,888,810 B2
(45) Date of Patent: Jan. 12, 2021

(54) INLINE FILTER SYSTEM HAVING A PRE-SEPARATOR MODULE

(71) Applicant: MANN+HUMMEL GmbH, Ludwigsburg (DE)

(72) Inventors: Michael A. Martin, Nashville, MI (US); Franziska Schulz, Schifferstadt (DE); Oliver Luley, Speyer (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 154 days.

(21) Appl. No.: 16/270,718

(22) Filed: Feb. 8, 2019

(65) Prior Publication Data
US 2019/0240606 A1 Aug. 8, 2019

Related U.S. Application Data

(60) Provisional application No. 62/627,873, filed on Feb. 8, 2018.

(51) Int. Cl.
*B01D 45/18* (2006.01)
*B01D 46/00* (2006.01)
(Continued)

(52) U.S. Cl.
CPC ......... *B01D 46/0026* (2013.01); *B01D 45/16* (2013.01); *B01D 46/0004* (2013.01);
(Continued)

(58) Field of Classification Search
CPC .............. B01D 46/0026; B01D 45/16; B01D 46/0004; B01D 50/002; B01D 46/2403; B01D 46/0012; B01D 46/48
See application file for complete search history.

(56) References Cited

U.S. PATENT DOCUMENTS 5,472,463 A * 12/1995 Herman ............. B01D 46/0047
123/198 E
7,905,936 B2 * 3/2011 Coulonvaux ...... B01D 46/0005
55/357
(Continued)

FOREIGN PATENT DOCUMENTS

EP 1015751 B1 7/2000
EP 1303694 B1 4/2003
(Continued)

*Primary Examiner* — Dung H Bui
(74) *Attorney, Agent, or Firm* — James Hasselbeck

(57) ABSTRACT

Air filter system includes a main housing, in which a primary filter cartridge can operably be installed, the housing includes a clean air outlet and a service opening through which the primary filter cartridge can be installed, a pre-separator assembly mounted onto and closing off the service opening, the pre-separator assembly having an inlet flow face receiving air to be cleaned from the outside, an outlet flow face through which pre-cleaned air exits, the outlet flow face positioned over the service opening of the main housing, such that pre-cleaned air is provided to the main housing, a dust discharge port, through which particles pre-separated by the pre-separator can be discharged, wherein the main housing comprises a connection port operable to sealingly connect to the dust discharge port on one side and sealingly connect a scavenge line on the other side, the connection port operable to connect the dust discharge port and a scavenge line.

2 Claims, 4 Drawing Sheets

(51) Int. Cl.
   *B01D 46/48*   (2006.01)
   *B01D 45/16*   (2006.01)
   *B01D 50/00*   (2006.01)
   *B01D 46/24*   (2006.01)

(52) U.S. Cl.
   CPC ..... *B01D 46/0012* (2013.01); *B01D 46/2403* (2013.01); *B01D 46/48* (2013.01); *B01D 50/002* (2013.01)

(56) References Cited

U.S. PATENT DOCUMENTS

| | | | | |
|---|---|---|---|---|
| 2003/0217534 | A1* | 11/2003 | Krisko | B01D 46/525 55/337 |
| 2004/0040271 | A1* | 3/2004 | Kopec | B01D 46/0004 55/357 |
| 2008/0016832 | A1* | 1/2008 | Krisko | B01D 45/16 55/342 |
| 2010/0186353 | A1* | 7/2010 | Ackermann | F02M 35/0203 55/321 |
| 2010/0313533 | A1* | 12/2010 | Muenkel | B01D 46/523 55/484 |
| 2012/0233972 | A1* | 9/2012 | Menssen | F02M 35/0203 55/325 |
| 2013/0031878 | A1* | 2/2013 | Menssen | F02M 35/0223 55/345 |
| 2013/0327005 | A1* | 12/2013 | Menssen | B01D 46/2411 55/493 |
| 2014/0290194 | A1* | 10/2014 | Muenkel | B01D 46/523 55/482 |
| 2015/0343366 | A1* | 12/2015 | Wuebbeling | F02M 35/0223 55/337 |
| 2017/0304760 | A1* | 10/2017 | Kaufmann | B01D 50/002 |

FOREIGN PATENT DOCUMENTS

| | | |
|---|---|---|
| EP | 2113650 B1 | 11/2009 |
| EP | 2675547 B1 | 12/2013 |
| KR | 20110037584 A | 4/2011 |
| WO | 2016082852 A1 | 6/2016 |

\* cited by examiner

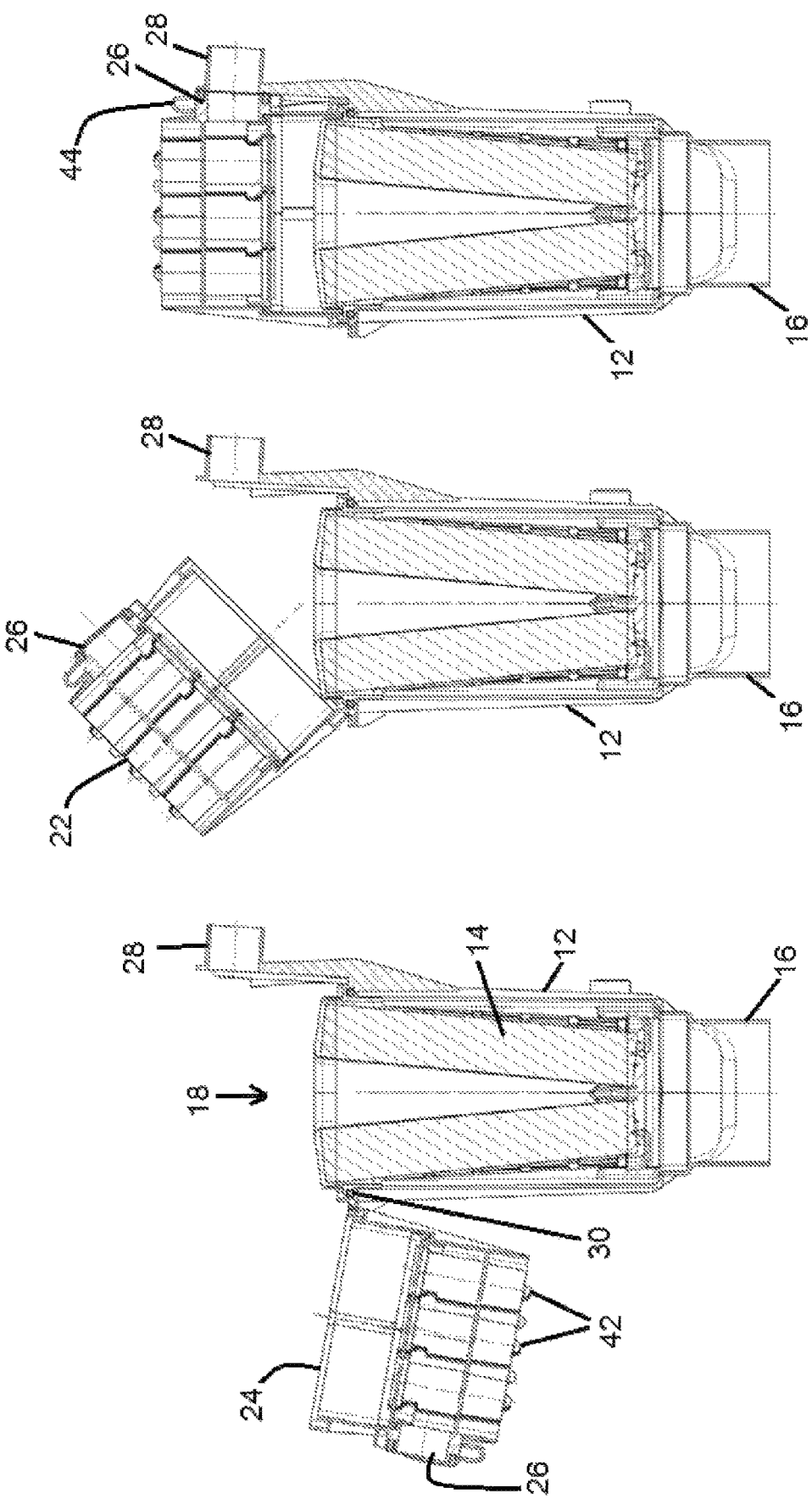

INLINE FILTER SYSTEM HAVING A PRE-SEPARATOR MODULE

TECHNICAL FIELD

The invention concerns a housing of an inline air filter for filtration of gaseous fluid, in particular air, in particular of an internal combustion engine, in particular of a motor vehicle, of a construction or agricultural machine and/or of a compressor.

Moreover, the invention concerns an inline filter system, in particular a modularly configured filter system, for filtration of gaseous fluid, in particular air, in particular of an internal combustion engine, in particular of a motor vehicle, of a construction or agricultural machine and/or of a compressor.

BACKGROUND OF THE INVENTION

Inline filter systems usually comprise a pre-separator comprising a plurality of cyclone cells and a main filter housing, into which a main filter insert and optionally a secondary or safety filter insert are operably mounted.

WO 2016/082852 A1 discloses an inline air filter that is designed for linear flow therethrough. The air filter comprises a filter insert that can be separated from the rest of the air filter and exchanged. A cyclone block is configured as a cover and is removed for servicing the filter insert. If a scavenging line is attached to the dust outlet opening of the cyclone block or pre-separator block, the scavenging line needs to be flexible to allow for removal of the cyclone block and often needs to be removed from the cyclone block for servicing.

SUMMARY OF THE INVENTION

It is the object of the invention to design a filter system that allows for easier servicing of an inline filter system with removable cyclone block or pre-separator block.

This object is achieved by providing an it filter system comprising
a. a main housing, in which a primary filter cartridge can operably be installed, the housing comprising a clean air outlet and a service opening through which the primary filter cartridge can be installed,
b. a pre-separator assembly mounted onto and closing off the service opening, the pre-separator assembly comprising
i. an inlet flow face receiving air to be cleaned from the outside,
ii. an outlet flow face through which pre-cleaned air exits, the outlet flow face positioned over the service opening of the main housing, such that pre-cleaned air is provided to the main housing,
iii. a dust discharge port, through which particles pre-separated by the pre-separator can be discharged,
wherein the main housing comprises a connection port operable to sealingly connect to the dust discharge port on one side and sealingly connect a scavenge line on the other side, the connection port operable to connect the dust discharge port and a scavenge line.

Preferably, the pre-separator assembly is connected to the main housing allowing for rotating the pre-separator assembly about that hinge for opening the service opening.

In a further preferred embodiment, the connection port and dust discharge port are configured such that when the housing is opened by removing the pre-separator assembly from the service opening, the dust discharge port is disconnected from the connection port, and when the housing is closed by attaching the pre-separator assembly to the main housing body over the service opening, the dust discharge port is connected to the connection port.

BRIEF DESCRIPTION OF THE DRAWINGS

Further advantages, features, and details of the invention result from the following description in which embodiments of the invention will be explained in more detail with the aid of the drawing. A person of skill in the art will consider the features disclosed in the drawing, the description, and the claims in combination also expediently individually and combine them to other meaningful combinations.

FIGS. 4A-4C depict the pre-separator assembly in sequenced positions for better understanding, rotating relative to the main housing from an open position (4A), through intermediate position (4B), to a closed position (4C).

DETAILED DESCRIPTION

Figure 1:
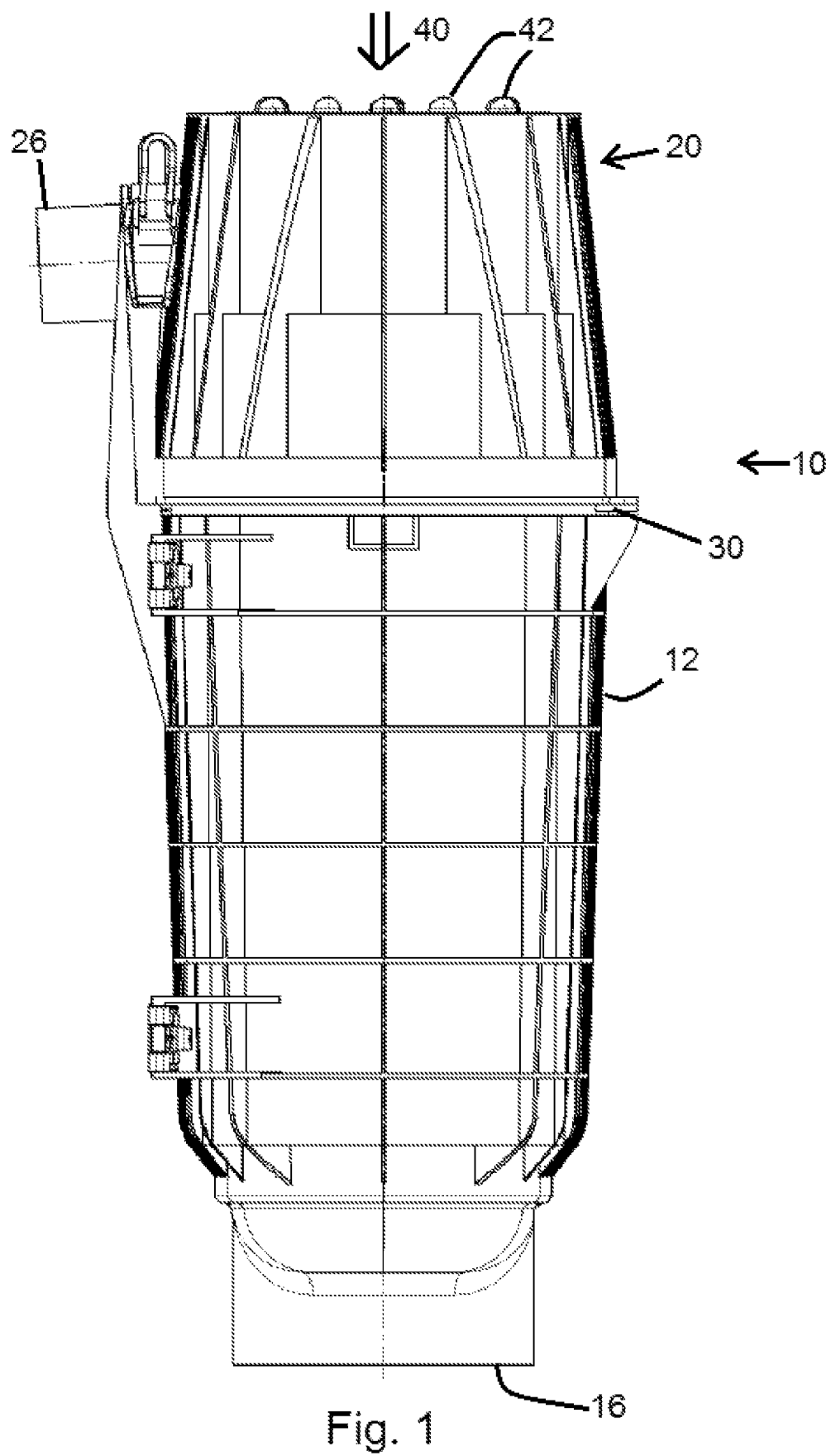
FIG. 1 depicts a side view of an exemplary air filter system, schematically illustrating the inventive concepts disclosed herein, consistent with the present inventive disclosure.
Figure 2:
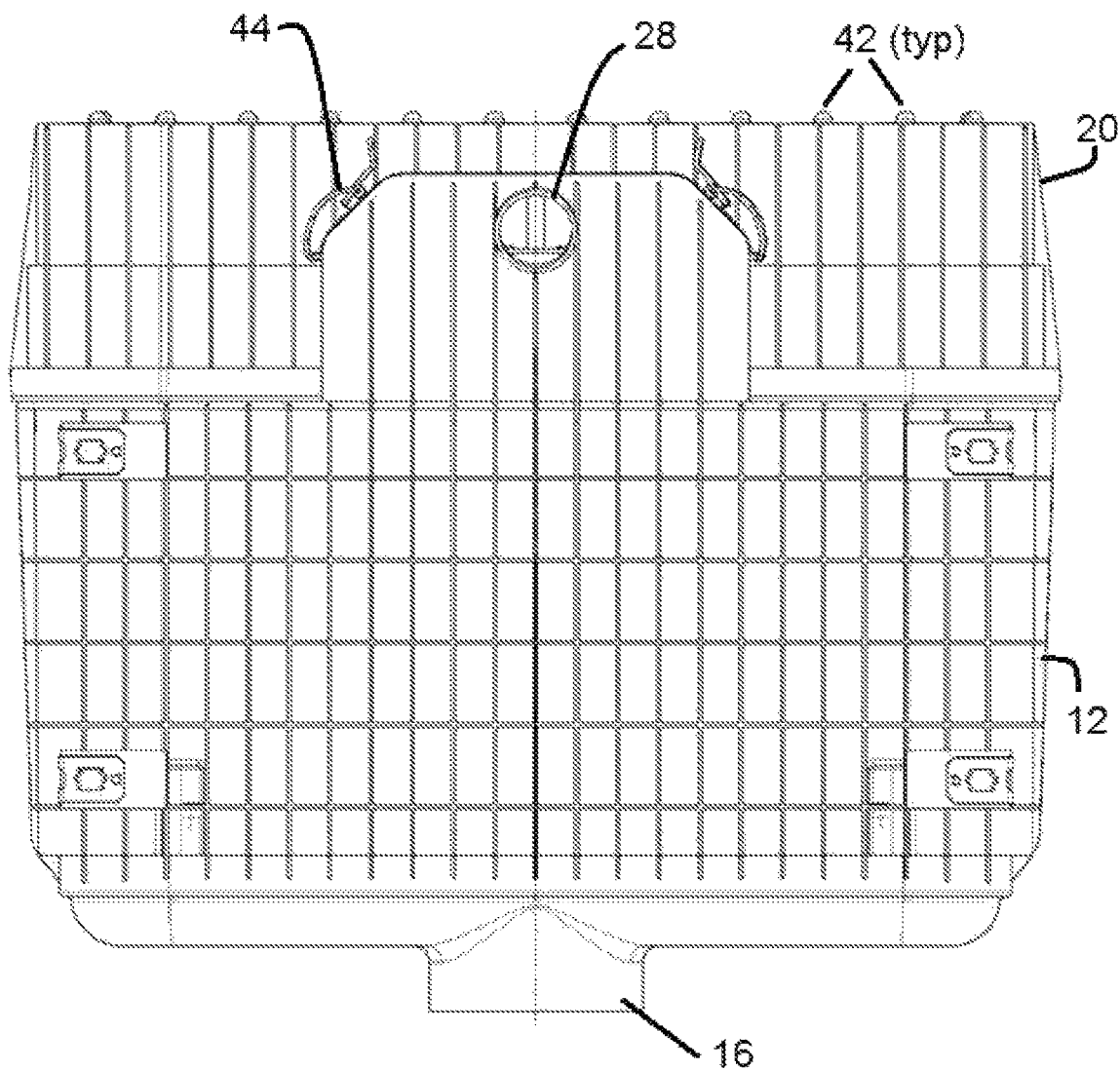
FIG. 2 depicts a rear view of the exemplary air filter system for FIG. 1, consistent with the present inventive disclosure.
Figure 3:
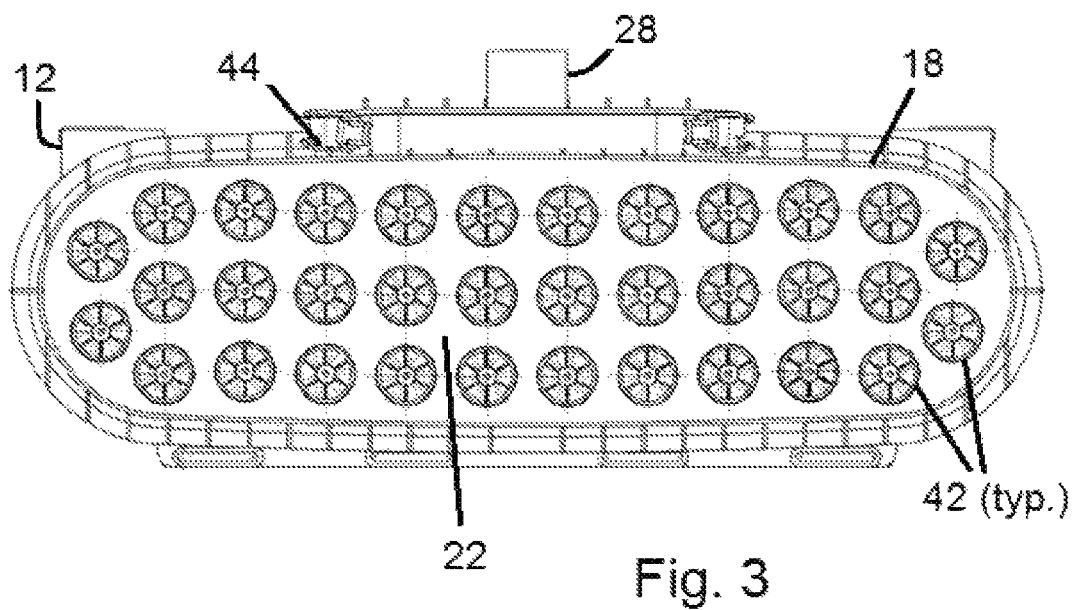
FIG. 3 depicts a top view of the exemplary air filter system for FIG. 1, showing the pre-separator assembly in a closed, mounted position on the main housing.

As can be seen from the drawings, an air filter system 12 is provided having:
a. a main housing 12, in which a primary filter cartridge 14 can operably be installed, the housing 12 having a clean air outlet 16 and a service opening 18 through which the primary filter cartridge 14 can be installed or removed from the housing 12,
b. a pre-separator assembly 20 having, a cyclone block of, preferably, a plurality of cyclone separators 42, the pre-separator assembly 20 mounted onto and closing off the service opening 18, the pre-separator assembly 20 having:
  i. an inlet flow face 22 receiving air to be cleaned 40 from the outside environment,
  ii. an outlet flow face 24 through which pre-cleaned air exits the pre-separator assembly 20, the outlet flow face positioned over and preferably closeable against the service opening 18 of the main housing 12, such that pre-cleaned air is provided to the main housing 12,
  iii. a dust discharge port 26, through which particles pre-separated by the cyclone separators 42 of the pre-separator assembly 20 can be discharged from the pre-separator assembly 20.

The main housing 12 has a connection port 28, preferably tubular, preferably with an elastomeric seal or sealing surface operable to sealingly connect to the dust discharge port 26 on one side and to sealingly connect a scavenge line (not shown) on the other side, the connection port 28 operable to fluidically connect the dust discharge port 26 to the and scavenge line.

Preferably, the pre-separator assembly 20 is pivotably or rotatably connected to the main housing 12 by a pivot point or hinge 30, allowing for rotating the pre-separator assembly 20 about that hinge 30 for opening the service opening 18 (open positions shown in FIGS. 4A and 4B).

In a further preferred embodiment, the connection port 28 and dust discharge port 26 are configured such that when the housing is opened by removing or rotating the pre-separator assembly 20 from the service opening 18, the dust discharge port 26 is fluidically disconnected from the connection port 28, and when the housing 12 is closed by attaching the pre-separator assembly to the main housing body and/or rotating the pre-separator assembly to close over the service opening 18 of the main housing body, such that the dust discharge port 26 is fluidically connected to the connection port 28.

The pre-separator assembly 20 may be locked in a closed position (shown in FIG. 4C), covering the service opening 18 of the housing 12 by fasteners 44. The fasteners 44 are preferably arranged on or near a side of the housing opposite the pivot point or hinge 30 and configured to securely fasten or press the pre-separator assembly 20 onto the housing 12 to close the service opening 18. In some embodiments, the fasteners 44 may be embodied as spring clips.

What is claimed is:

1. Air filter system comprising:
   a. a main housing, in which a primary filter cartridge is operably be installed, the housing comprising a clean air outlet and a service opening through which the primary filter cartridge is installed;
   b. a pre-separator assembly mounted onto and closing off the service opening, the pre-separator assembly having:
      i. an inlet flow face receiving air to be cleaned from an outside environment;
      ii. an outlet flow face through which pre-cleaned air exits, the outlet flow face positioned over the service opening of the main housing, such that pre-cleaned air is provided to the main housing;
      iii. a dust discharge port, through which particles pre-separated by the pre-separator are discharged; and
      iv. a plurality of cyclone separators arranged between the inlet face and the outlet face for pre-separating dust from the air to be cleaned;
   wherein the main housing includes a connection port operable to sealingly connect to the dust discharge port on one side and sealingly connect a scavenge line on the other side, the connection port operable to connect the dust discharge port and a scavenge line,
   wherein the pre-separator assembly is pivotably connected to the main housing by a hinge, allowing for pivoting the pre-separator assembly relative to the main housing about the hinge for opening the service opening,
   wherein the connection port and the dust discharge port are configured such that when the housing is opened by pivotably removing the pre-separator assembly from the service opening, the dust discharge port is disconnected from the connection port, and when the housing is closed by pivotably positioning the pre-separator assembly onto the main housing body over the service opening, the dust discharge port is thereby connected to the connection port.

2. The air filter system according to claim 1, wherein the connection port and the dust discharge port are configured such that when the housing is opened by removing the pre-separator assembly from the service opening, the dust discharge port is disconnected from the connection port, and when the housing is closed by positioning the pre-separator assembly onto the main housing body over the service opening, the dust discharge port is thereby connected to the connection port.

* * * * *